United States Patent
Achihara et al.

(10) Patent No.: US 9,595,886 B2
(45) Date of Patent: Mar. 14, 2017

(54) VEHICLE AUXILIARY POWER SUPPLY DEVICE AND OVERCURRENT PROTECTION METHOD THEREOF

(75) Inventors: Masato Achihara, Tokyo (JP); Ryotaro Harada, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 402 days.

(21) Appl. No.: 14/359,516

(22) PCT Filed: Nov. 28, 2011

(86) PCT No.: PCT/JP2011/077393
§ 371 (c)(1),
(2), (4) Date: Jul. 22, 2014

(87) PCT Pub. No.: WO2013/080279
PCT Pub. Date: Jun. 6, 2013

(65) Prior Publication Data
US 2014/0346861 A1 Nov. 27, 2014

(51) Int. Cl.
*B60L 1/00* (2006.01)
*H02M 1/32* (2007.01)
(Continued)

(52) U.S. Cl.
CPC .............. *H02M 7/537* (2013.01); *B60L 1/00* (2013.01); *B60L 3/04* (2013.01); *B60L 11/182* (2013.01);
(Continued)

(58) Field of Classification Search
CPC .... H02M 7/537; H02M 7/53803; H02M 1/32; H02M 7/4807; H02M 2001/0058;
(Continued)

(56) References Cited

U.S. PATENT DOCUMENTS 4,078,247 A 3/1978 Albrecht
5,172,308 A 12/1992 Tohya
(Continued)

FOREIGN PATENT DOCUMENTS

GB 2002977 A 2/1979
JP 62-016077 A 1/1987
(Continued)

OTHER PUBLICATIONS

Office Action issued on Nov. 4, 2015, by the Chinese Patent Office in corresponding Chinese Patent Application No. 201180075072.7, and an English Translation of the Office Action. (14 pages).
(Continued)

*Primary Examiner* — Hal Kaplan
(74) *Attorney, Agent, or Firm* — Buchanan Ingersoll & Rooney PC

(57) ABSTRACT

A vehicle auxiliary power supply device includes a resonant inverter circuit that converts DC input into a desired AC voltage and outputs the AC voltage and a control unit. The control unit includes a resonance-time managing unit managing resonance time of current flowing in the resonant inverter circuit, a gate-off-command generating unit detecting overcurrent flowing in the resonant inverter circuit based on detected current of a current detector, and, when the overcurrent is detected, generating, based on detected current of the current detector and resonance time managed by the resonance-time managing unit, a gate-off command to turn off switching elements included in the resonant inverter circuit after the elapse of time after which current flowing in the switching elements becomes zero for the first time, and a gate-signal generating unit generating a gate signal that controls the switching elements to be turned off when the gate-off command is input.

3 Claims, 6 Drawing Sheets

(51) Int. Cl.
  *H02M 7/537* (2006.01)
  *B60L 3/04* (2006.01)
  *B60L 11/18* (2006.01)
  *H02M 7/538* (2007.01)
  *H02H 7/122* (2006.01)
  *H02M 1/00* (2006.01)
  *H02M 7/48* (2007.01)

(52) U.S. Cl.
  CPC ...... *H02H 7/1225* (2013.01); *H02M 7/53803* (2013.01); *B60L 2210/00* (2013.01); *H02M 1/32* (2013.01); *H02M 7/4807* (2013.01); *H02M 2001/0058* (2013.01); *H02M 2007/4815* (2013.01); *Y02T 10/7005* (2013.01); *Y02T 10/7072* (2013.01); *Y02T 10/92* (2013.01); *Y02T 90/122* (2013.01); *Y02T 90/127* (2013.01); *Y02T 90/14* (2013.01)

(58) Field of Classification Search
  CPC .... H02M 2007/4815; B60L 1/00; B60L 3/04; B60L 11/182; B60L 2210/00; H02H 7/1225; Y02T 10/7005; Y02T 10/7072; Y02T 10/92; Y02T 90/122; Y02T 90/127; Y02T 90/14
  USPC .......................................................... 307/9.1
  See application file for complete search history.

(56) References Cited

U.S. PATENT DOCUMENTS 5,434,770 A  7/1995  Dreifuerst et al.

2010/0277956 A1  11/2010  Kurokawa et al.

FOREIGN PATENT DOCUMENTS

| JP | 02-036769 A | 2/1990 |
| JP | 04-017567 A | 1/1992 |
| JP | 2000-014161 A | 1/2000 |
| JP | 2005-135619 A | 5/2005 |
| JP | 2006-032148 A | 2/2006 |
| JP | 2007-215256 A | 8/2007 |
| JP | 2010-279214 A | 12/2010 |
| JP | 4720514 B | 4/2011 |
| WO | WO 2009/060807 A2 | 5/2009 |

OTHER PUBLICATIONS

Yu-Lung Ke et al., "Application of Buck Zero-Current-Switching Pulse-Width-Modulated Converter in Battery Chargers", Industrial & Commercial Power Systems Technical Conference, 2007, ICPS 2007, IEEE/IAS, 2007 (8 pages).
Canadian Office Action dated Sep. 1, 2015, issued in corresponding Canadian Patent Appln. No. 2,856,670 (4 pages).
Office Action issued on Jun. 2, 2016, by the Canadian Patent Office in corresponding Canadian Patent Application No. 2,856,670. (3 pages).
European Search Report dated May 7, 2015 issued in corresponding European Patent Appln. No. 11876778.9 (8 pages).
International Search Report (PCT/ISA/210) mailed on Jan. 17, 2012, by the Japanese Patent Office as the International Searching Authority for International Application No. PCT/JP2011/077393.
Written Opinion (PCT/ISA/237) mailed on Jan. 17, 2012, by the Japanese Patent Office as the International Searching Authority for International Application No. PCT/JP2011/077393.

VEHICLE AUXILIARY POWER SUPPLY DEVICE AND OVERCURRENT PROTECTION METHOD THEREOF

FIELD

The present invention relates to a vehicle auxiliary power supply device that is mounted on an electric vehicle and, particularly, to a vehicle auxiliary power supply device that includes a resonant inverter circuit and an overcurrent protection method thereof.

BACKGROUND

A large number of electrical devices (loads) having a relatively large rated power are mounted on an electric vehicle. Therefore, it is essential to configure, in the resonant inverter circuit included in the vehicle auxiliary power supply device, a protection function against overcurrent.

The idea behind conventional overcurrent protection in the resonant inverter circuit is generally to immediately turn off the switching element (hereinafter, described as "SW element") when overcurrent is detected.

Although it is neither a technology related to the vehicle auxiliary power supply device nor a technology related to the resonant inverter circuit, the invention of Patent Literature 1 described below (name of the invention: current detection method in a resonant converter) discloses a technology in which when overcurrent is detected, the on-time of the SW element is reduced, thereby limiting the current flowing in the SW element and thus preventing the SW element from being destroyed (hereinafter, referred to as "element destruction").

CITATION LIST

Patent Literature

Patent Literature 1: Japanese Patent No. 4720514

SUMMARY

Technical Problem

As described above, with the overcurrent protection according to the conventional technology, when overcurrent is detected, the SW element is controlled such that the SW element is immediately turned off or the current flowing in the SW element is limited by reducing the on-time of the SW element, thereby preventing element destruction. Therefore, in the resonant inverter circuit that performs control of fixing the on-time of the SW element in order to make the resonance frequency constant, it is necessary to select, as the SW element included in the circuit, a high-specification element capable of withstanding an interrupting voltage and an interrupting current at the time of overcurrent protection.

The present invention has been achieved in view of the above and an object of the present invention is to provide a vehicle auxiliary power supply device in which a resonant inverter circuit can be configured without using a high-specification element capable of withstanding an interrupting voltage and an interrupting current at the time of overcurrent protection and to provide an overcurrent protection method thereof.

Solution to Problem

In order to solve the above problems and achieve the object, the present invention is a vehicle auxiliary power supply device that is mounted on an electric vehicle and that includes a resonant inverter circuit that converts an input DC voltage into a desired AC voltage and outputs the AC voltage and a control unit that controls the resonant inverter circuit, wherein a current detector is provided on an output side of the resonant inverter circuit, and the control unit includes a resonance-time managing unit that manages resonance time of a current flowing in the resonant inverter circuit, a gate-off-command generating unit that detects overcurrent flowing in the resonant inverter circuit on a basis of a detected current of the current detector, and that, when the overcurrent is detected, generates, on a basis of a detected current of the current detector and resonance time managed by the resonance-time managing unit, a gate-off command to turn off a switching element included in the resonant inverter circuit after an elapse of time after which a current flowing in the switching element becomes zero for a first time, and a gate-signal generating unit that generates a gate signal that controls the switching element such that the switching element is turned off when the gate-off command is input.

Advantageous Effects of Invention

According to the present invention, an effect is obtained where a resonant inverter circuit included in a vehicle auxiliary power supply device can be configured without using a high-specification element capable of withstanding an interrupting voltage and an interrupting current at the time of overcurrent protection.

BRIEF DESCRIPTION OF DRAWINGS

FIG. 4 is a diagram illustrating a resonance current that flows when a switching element HGU1 is on.

FIG. 5 is a diagram illustrating a resonance current that flows when a switching element HGV2 is on.

DESCRIPTION OF EMBODIMENTS

A vehicle auxiliary power supply device according to embodiments of the present invention will be explained below with reference to the accompanying drawings. The present invention is not limited to the embodiments.

Embodiment

Figure 1:
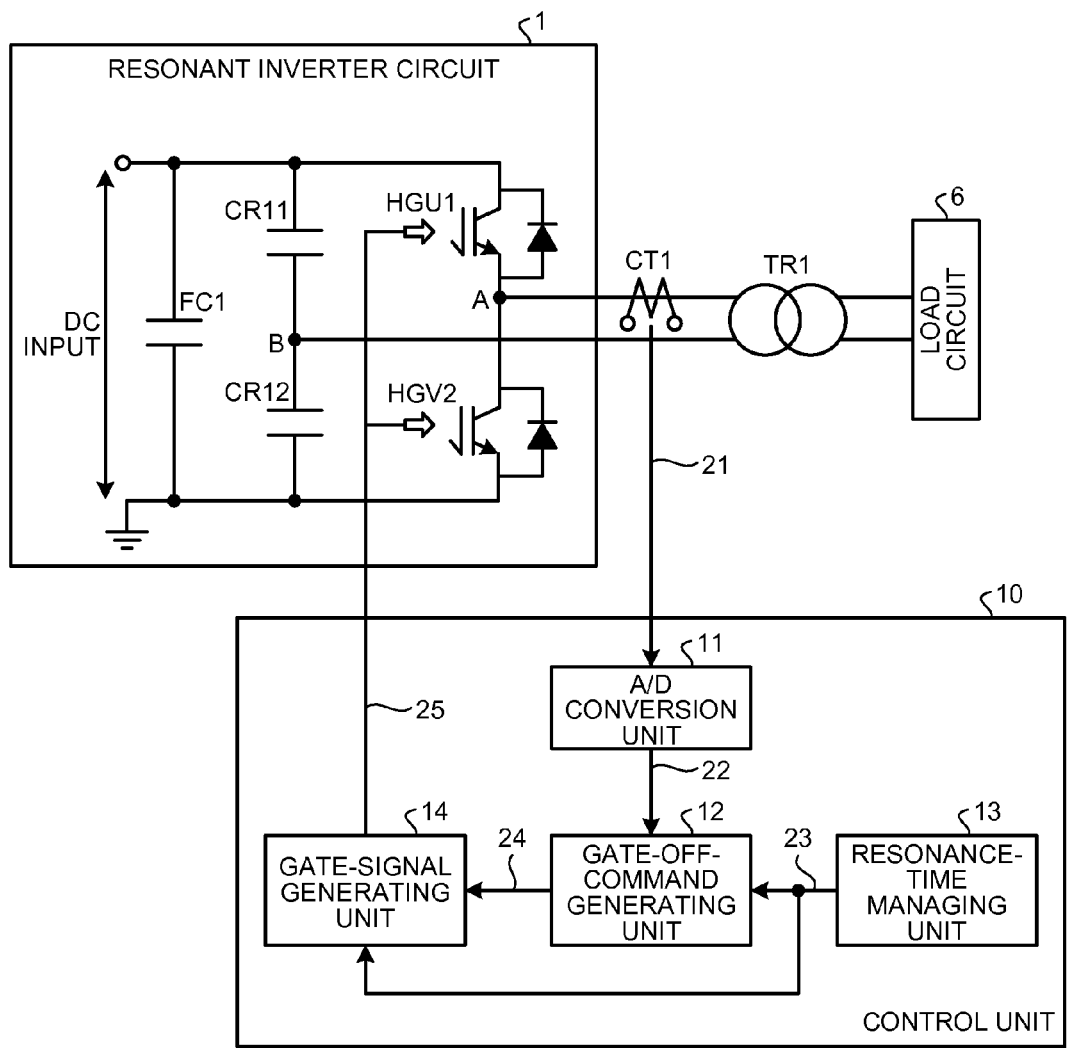
FIG. 1 is a diagram illustrating a configuration example of a resonant inverter circuit and a control unit, which controls the resonant inverter circuit, used in a vehicle auxiliary power supply device according to an embodiment of the present invention.

FIG. 1 is a diagram illustrating a configuration example of a resonant inverter circuit 1 and a control unit 10, which controls the resonant inverter circuit 1, used in a vehicle auxiliary power supply device according to an embodiment of the present invention. The resonant inverter circuit 1 illustrated in FIG. 1 has such a configuration that, with respect to a direct current (DC) input, resonant capacitors CR11 and CR12 connected in series are provided in the stage subsequent to a filter capacitor FC1 and switching elements HGU1 and HGV2 connected in series are provided in the stage subsequent to the resonant capacitors CR11 and CR12. As illustrated in FIG. 1, the switching elements HGU1 and HGV2 are each typically configured such that an IGBT and a diode are connected in anti-parallel. A MOSFET or the like is used instead of an IGBT in some cases.

The series circuit composed of the resonant capacitors CR11 and CR12 and the series circuit composed of the switching elements HGU1 and HGV2 are both connected in parallel with the filter capacitor FC1. A connection end A of the switching element HGU1 and the switching element HGV2 and a connection end B of the resonant capacitor CR11 and the resonant capacitor CR12 both form AC ends of the resonant inverter circuit 1 and are connected to a transformer TR1. Furthermore, a current detector CT1 for detecting the output current of the resonant inverter circuit 1 is provided between the resonant inverter circuit 1 and the transformer TR1.

Next, the control unit 10 is explained. The control unit 10 is a component that controls the operation of the resonant inverter circuit 1 on the basis of the current detected by the current detector CT1. The control unit 10 is configured to include an A/D conversion unit 11, a gate-off-command generating unit 12, a resonance-time managing unit 13, and a gate-signal generating unit 14.

The A/D conversion unit 11 converts an analog current value 21 detected by the current detector CT1 into a digital value. The digital value converted by the A/D conversion unit 11 is input to the gate-off-command generating unit 12 as a detected current 22.

The resonance-time managing unit 13 is a component that manages the resonance time (resonance frequency) of the current flowing in the resonant inverter circuit 1. In an example in the present embodiment, the resonance-time managing unit 13 generates a resonance-time managing signal 23. The resonance-time managing signal 23 generated by the resonance-time managing unit 13 is input to both the gate-off-command generating unit 12 and the gate-signal generating unit 14.

The gate-off-command generating unit 12 is a component that has a protection function (protection logic) against overcurrent. The gate-off-command generating unit 12 generates a gate-off command 24 for implementing this overcurrent protection function on the basis of the detected current 22 and the resonance-time managing signal 23. The gate-off command 24 generated by the gate-off-command generating unit 12 is input to the gate-signal generating unit 14.

The gate-signal generating unit 14 is a component that generates a gate signal 25 for controlling the switching elements HGU1 and HGV2. This gate signal 25 is generated on the basis of the resonance-time managing signal 23 when the overcurrent protection function is disabled and is generated on the basis of the resonance-time managing signal 23 and the gate-off command 24 when the overcurrent protection function is enabled.

Figure 2:
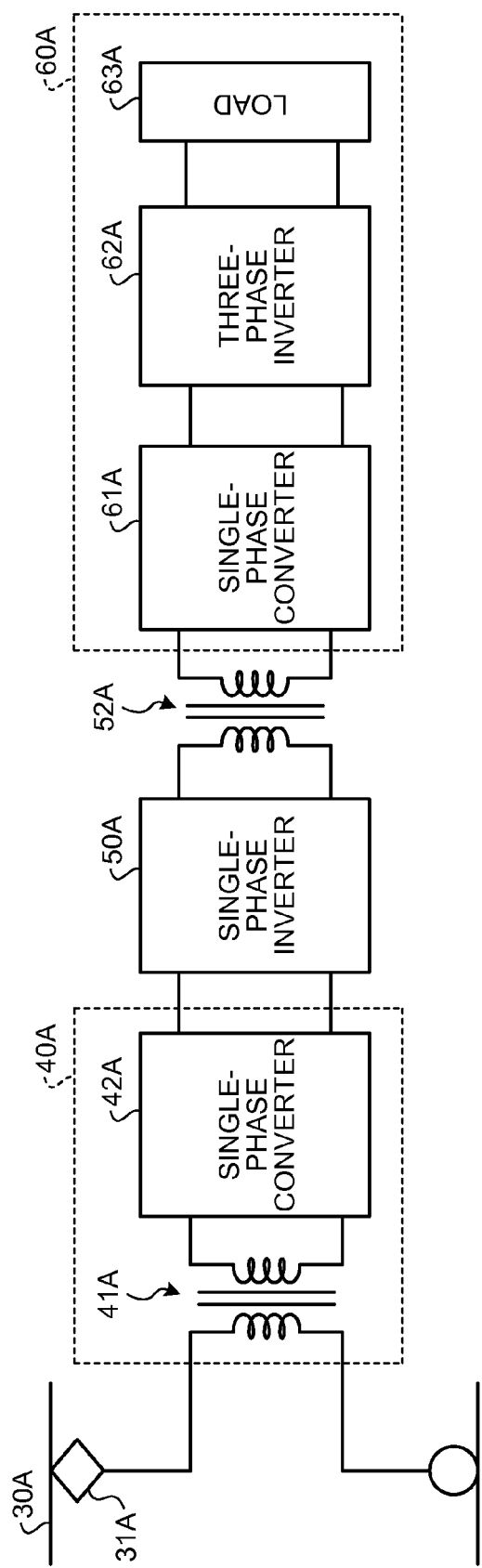
FIG. 2 is a diagram illustrating a configuration example of a vehicle auxiliary power supply device that is connected to an AC overhead wire.

Next, an explanation will be made of the configuration of the vehicle auxiliary power supply device that includes the resonant inverter circuit 1. FIG. 2 is a diagram illustrating a configuration example of a vehicle auxiliary power supply device that is connected to an AC overhead wire. This vehicle auxiliary power supply device is a power supply device that receives AC power from an AC overhead wire 30A via a power collector 31A and supplies a desired AC power to a load 63A, such as an air-conditioner, a lighting device, and a door opening and shutting device. FIG. 2 illustrates a configuration example when the overhead wire voltage is relatively high and illustrates the configuration in which a voltage is stepped down in stages using two transformers 41A and 52A and two single-phase converters 42A and 61A.

In FIG. 2, an input circuit 40A, which includes the transformer 41A and the single-phase converter 42A, corresponds to the DC input in FIG. 1; a load circuit 60A, which includes the single-phase converter 61A, a three-phase inverter 62A, and the load 63A, corresponds to a load circuit 6 in FIG. 1; the transformer 52A corresponds to the transformer TR1; and a single-phase inverter 50A corresponds to the resonant inverter circuit 1 described above.

Figure 3:
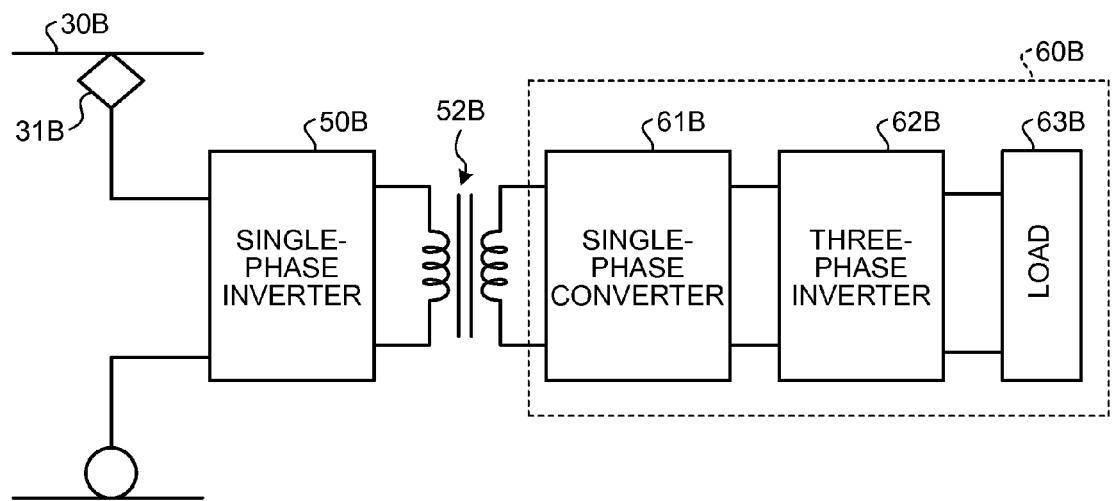
FIG. 3 is a diagram illustrating a configuration example of a vehicle auxiliary power supply device that is connected to a DC overhead wire.

FIG. 3 is a diagram illustrating a configuration example of a vehicle auxiliary power supply device that is connected to a DC overhead wire. This vehicle auxiliary power supply device is a power supply device that receives DC power from a DC overhead wire 30B via a power collector 31B and supplies a desired AC power to a load 63B, such as an air-conditioner, a lighting device, and a door opening and shutting device. The correspondence with FIG. 1 is explained. In FIG. 3, the DC power received from the DC overhead wire 30B corresponds to the DC input in FIG. 1; a load circuit 60B, which includes a single-phase converter 61B, a three-phase inverter 62B, and the load 63B, corresponds to the load circuit 6 in FIG. 1; a transformer 52B corresponds to the transformer TR1; and a single-phase inverter 50B corresponds to the resonant inverter circuit 1 described above.

Next, the operation of the resonant inverter circuit 1 is explained. In the resonant inverter circuit 1, a resonance current flows because of a series resonance (current resonance) due to the leakage inductance of the transformer TR1, an inductance (circuit inductance) that is present in the current path of the resonant inverter circuit 1, and any of the resonant capacitors CR11 and CR12. Meanwhile, on/off switching control of the switching elements HGU1 and HGV2 is performed by using the points at which the resonance current becomes zero. Therefore, the resonant inverter circuit 1 has a characteristic that the switching loss can be made substantially zero.

Figure 4:
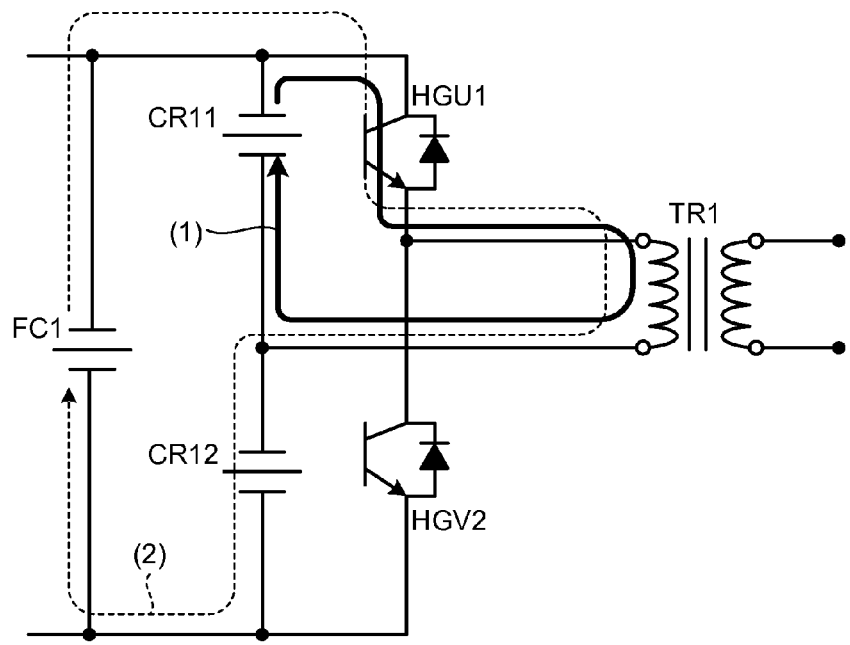
Figure 5:
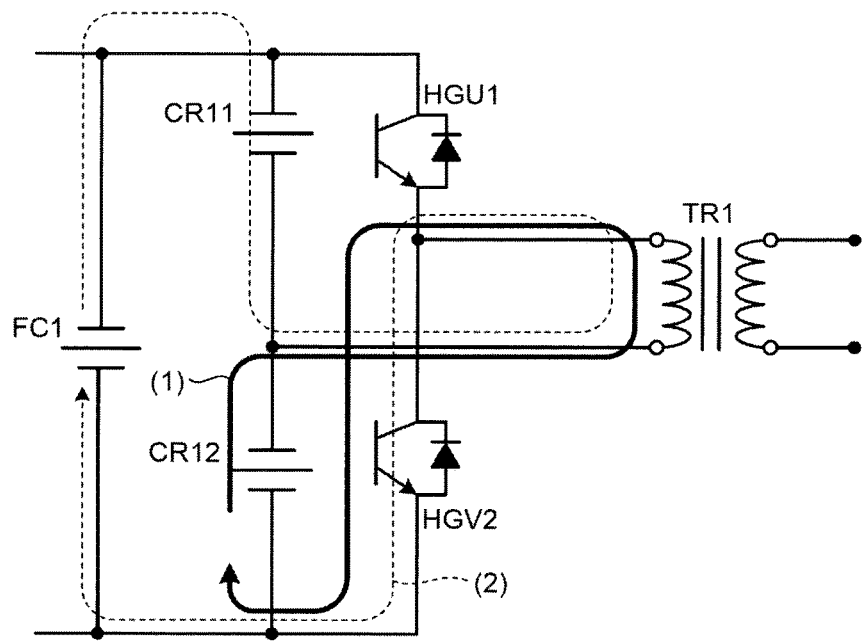

FIG. 4 is a diagram illustrating the path of the resonance current that flows when the switching element HGU1 is on, and FIG. 5 is a diagram illustrating the path of the resonance current that flows when the switching element HGV2 is on.

When the switching element HGU1 is on, two current loops (current loops 1 and 2) as illustrated in FIG. 4 are generated in the circuit. In the current loop 1, the current flows in the path starting from the resonant capacitor CR11→the switching element HGU1→the transformer TR1→the resonant capacitor CR11. In the current loop 2, the current flows in the path starting from the filter capacitor FC1→the switching element HGU1→the transformer TR1→the resonant capacitor CR12→the filter capacitor FC1.

When the switching element HGV2 is on, two current loops (current loops 1 and 2) as illustrated in FIG. 5 are generated. In the current loop 1, the current flows in the path starting from the resonant capacitor CR12→the transformer TR1→the switching element HGV2→the resonant capacitor CR12. In the current loop 2, the current flows in the path starting from the filter capacitor FC1→the resonant capacitor CR11→the transformer TR1→the switching element HGV2→the filter capacitor FC1.

As illustrated in FIG. 4 and FIG. 5, at the timing at which the switching elements HGU1 and HGV2 are switched, the direction of the current flowing in the transformer TR1 changes. In other words, it is understood that the switching elements HGU1 and HGV2 are turned off by using the points at which the resonance current becomes zero.

Next, an explanation will be made of the protection function (protection logic) against overcurrent. Overcurrent generated in the resonant inverter circuit is generated because of the short-circuit of a load or the like and is a serious failure mode that leads to element destruction due to an excessive short-circuit current flowing in the switching element. Therefore, it is necessary for the switching element to have sufficient breakdown voltage and current capacity so as not to cause element destruction of the switching element.

Figure 6:
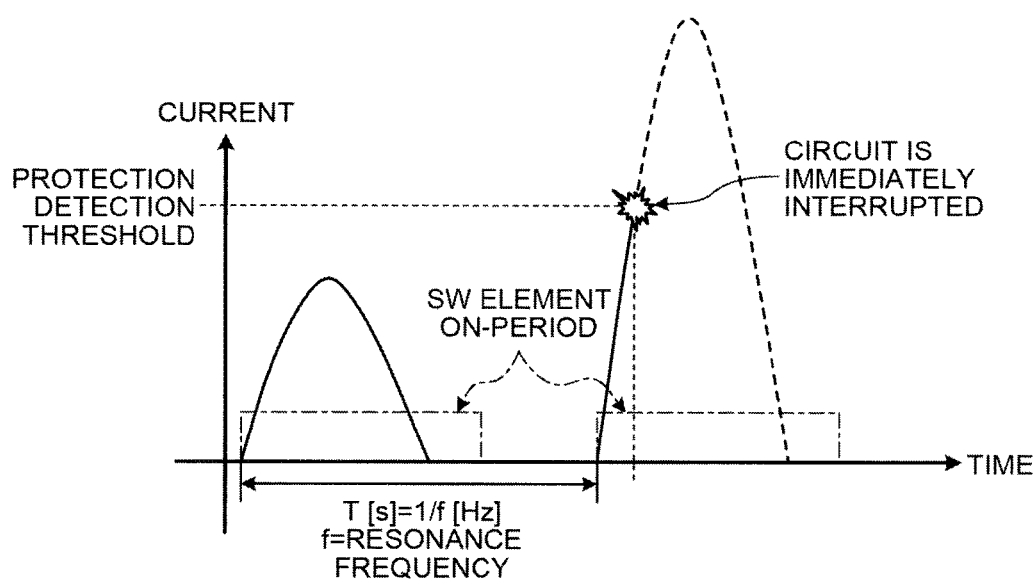
FIG. 6 is a diagram explaining a protection operation according to a conventional technology when overcurrent is detected.

FIG. 6 is a diagram explaining the protection operation according to the conventional technology when overcurrent is detected. In FIG. 6, the horizontal axis indicates the time and the vertical axis indicates the current value of the resonance current. When the current exceeds a threshold for protection detection, in the conventional technology, as illustrated in FIG. 6, the current is immediately interrupted. However, when the switching element is interrupted outside the safe operating region, such as during an overcurrent state, the amount of voltage overshoot due to the interrupting current increases. Therefore, in the conventional technology, a high-specification switching element with sufficient breakdown voltage and current capacity is selected and used in anticipation of this amount of voltage overshoot.

Figure 7:
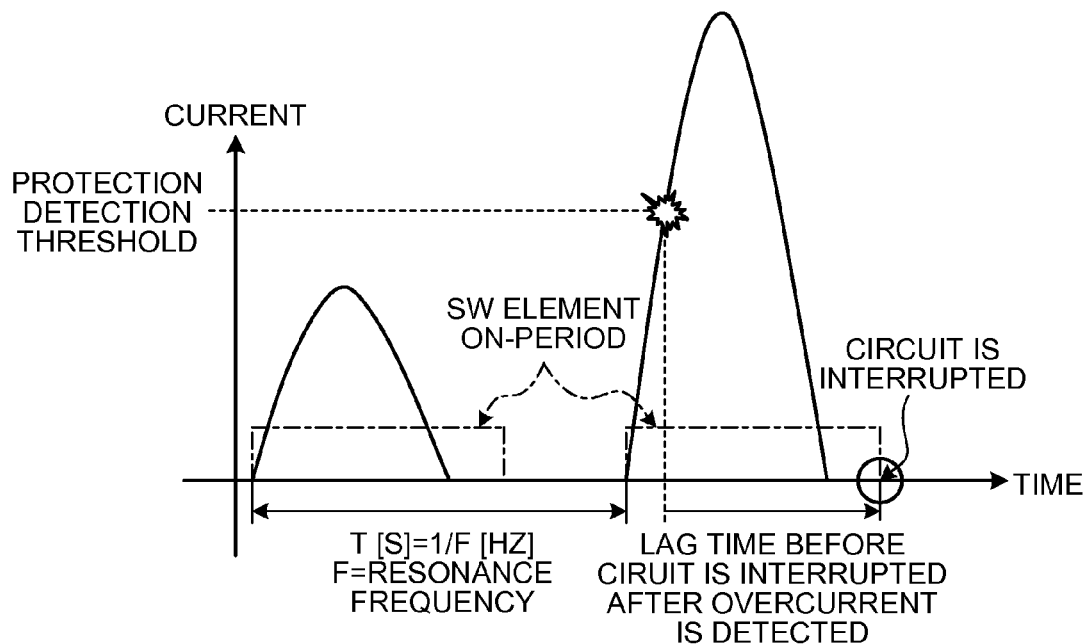
FIG. 7 is a diagram explaining a protection operation according to the present embodiment when overcurrent is detected.

In contrast, FIG. 7 is a diagram explaining the protection operation according to the present embodiment. The current waveform illustrated in FIG. 7 is the same as that in FIG. 6. In the present embodiment, as illustrated in FIG. 7, when overcurrent flowing in the resonant inverter circuit is detected, the switching element is not immediately interrupted and a command (gate-off command) to turn off the switching element is output after the elapse of the time after which the current flowing in the switching element becomes zero for the first time (after the timing at which the current becomes zero for the first time or after the timing at which the current is supposed to become zero for the first time). In the case of a resonant inverter circuit, while the circuit is in operation, the resonance frequency is fixed; therefore, the resonance frequency is constant unless the resonance frequency collapses. Therefore, if turn-off control is performed on the switching element after waiting until the normal turn-off timing after overcurrent is detected, the amount of voltage overshoot can be prevented from increasing. Therefore, the resonant inverter circuit can be configured without selecting, as a switching element, a high-specification element when compared with the case of using the conventional technology.

Figure 8:
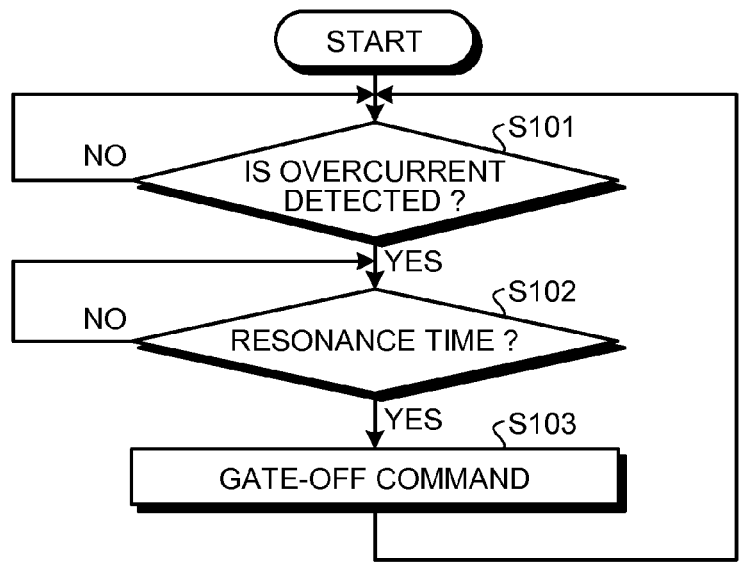
FIG. 8 is a flowchart explaining an operation of a gate-off-command generating unit.

FIG. 8 is a flowchart explaining the operation of the gate-off-command generating unit 12 illustrated in FIG. 1. The gate-off-command generating unit 12 determines whether the current flowing in the resonant inverter circuit 1 is overcurrent on the basis of the detected current 22 output from the A/D conversion unit 11 (Step S101: first determining step). When overcurrent is not detected (No at Step S101), the gate-off-command generating unit 12 continues the determining process at Step S101. In contrast, when overcurrent is detected (Yes at Step S101), the gate-off-command generating unit 12 determines whether the elapsed time since the overcurrent was detected has reached the resonance time (Step S102: second determining step). If the elapsed time since the overcurrent was detected has not reached the resonance time (No at Step S102), the gate-off-command generating unit 12 continues the determining process at Step S102. In contrast, if the elapsed time since the overcurrent was detected has reached the resonance time (Yes at Step S102), the gate-off-command generating unit 12 generates and outputs a gate-off command (Step S103). After the process at Step S103 is finished, the gate-off-command generating unit 12 returns to the process at Step S101 and continues the determining process of determining whether the current flowing in the resonant inverter circuit 1 is overcurrent.

Figure 9:
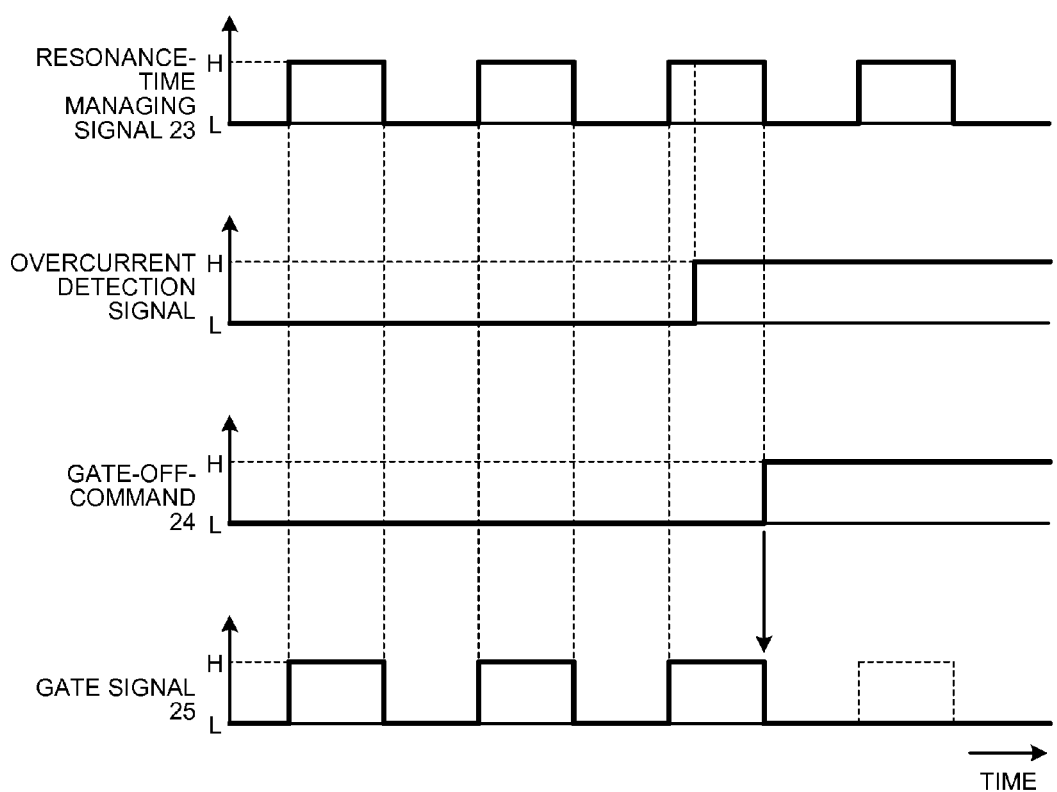
FIG. 9 is a time chart explaining an operation of a control unit.

FIG. 9 is a time chart for explaining the operation of the control unit 10. In FIG. 9, from top to bottom, the resonance-time managing signal 23, the overcurrent detection signal, the gate-off command 24, and the gate signal 25 are sequentially illustrated. The resonance-time managing signal 23 is a signal for determining the resonance current in the resonant inverter circuit 1. The overcurrent detection signal is a signal that is generated in the gate-off-command generating unit 12. When overcurrent is detected, the overcurrent detection signal is "H", and when overcurrent is not detected, the overcurrent detection signal is "L". In the example in FIG. 9, the resonance-time managing signal 23 and the gate signal 25 are shown as the same signal; however, this is not a limitation. For example, the resonance-time managing signal 23 and the gate signal 25 may have a signal form, such as a trigger signal that is output every resonance period.

In the case where overcurrent is detected when the gate signal 25 is intermittently output, the overcurrent detection signal is internally generated. However, in the protection logic in the present embodiment, as described above, the gate-off command 24 is not output immediately and the gate-off command 24 is output targeting the timing at which a pulse of the resonance-time managing signal 23 falls. When the gate-off command 24 is output, the gate signal 25 is not generated as long as the gate-off command 24 is "H" and the gate signal 25 is maintained at "L". The control unit 10 provides the overcurrent protection function by performing the operation as described above.

As described above, according to the vehicle auxiliary power supply device in the present embodiment, when overcurrent flowing in the resonant inverter circuit is detected, the gate-off command to turn off the switching element is output after the elapse of the time after which the current flowing in the switching element included in the resonant inverter circuit becomes zero for the first time; therefore, it is possible to configure a resonant inverter circuit included in the vehicle auxiliary power supply device without using a high-specification element that can withstand an interrupting voltage and an interrupting current at the time of overcurrent protection.

The configuration illustrated in the present embodiment described above is one example of the configuration of the present invention, and it is obvious that the configuration can be combined with other publicly-known technologies and can be changed, for example, by omitting part thereof, without departing from the scope of the present invention.

INDUSTRIAL APPLICABILITY

As described above, the vehicle auxiliary power supply device according to the present invention is useful as an invention that enables a resonant inverter circuit to be configured without using a high-specification element that can withstand an interrupting voltage and an interrupting current at the time of overcurrent protection.

REFERENCE SIGNS LIST 1 resonant inverter circuit
6, 60A, 60B load circuit
10 control unit
11 A/D conversion unit
12 gate-off-command generating unit
13 resonance-time managing unit
14 gate-signal generating unit
21 analog current value
22 detected current
23 resonance-time managing signal
24 gate-off command
25 gate signal
30A AC overhead wire
30B DC overhead wire
31A, 31B power collector
40A input circuit
42A, 61A single-phase converter
50A, 50B single-phase inverter
61A, 61B single-phase converter
62A, 62B three-phase inverter
63A, 63B load
41A, 52A, 52B, TR1 transformer
CR11, CR12 resonant capacitor
CT1 current detector
FC1 filter capacitor
HGU1, HGV2 switching element

The invention claimed is:

1. A vehicle auxiliary power supply device that is mounted on an electric vehicle and that includes a resonant inverter circuit that converts an input DC voltage into a desired AC voltage and outputs the AC voltage and a control unit that controls the resonant inverter circuit, wherein
a current detector is provided on an output side of the resonant inverter circuit, and
the control unit includes
a resonance-time managing unit that manages resonance time of a current flowing in the resonant inverter circuit,
a gate-off-command generating unit that detects overcurrent flowing in the resonant inverter circuit on a basis of a detected current of the current detector, and that, when the overcurrent is detected, generates, on a basis of a detected current of the current detector and resonance time managed by the resonance-time managing unit, a gate-off command to turn off a switching element included in the resonant inverter circuit after an elapse of time after which a current flowing in the switching element becomes zero for a first time, and
a gate-signal generating unit that generates a gate signal that controls the switching element such that the switching element is turned off when the gate-off command is input.

2. A vehicle auxiliary power supply device that is mounted on an electric vehicle and that includes a resonant inverter circuit that converts an input DC voltage into a desired AC voltage and outputs the AC voltage and a control unit that controls the resonant inverter circuit, wherein
a current detector is provided on an output side of the resonant inverter circuit, and
when overcurrent flowing in the resonant inverter circuit is detected on a basis of a detected current of the current detector, the control unit outputs a gate-off command to turn off a switching element included in the resonant inverter circuit after an elapse of time after which a current flowing in the switching element becomes zero for a first time.

3. An overcurrent protection method of a vehicle auxiliary power supply device that is mounted on an electric vehicle and that includes a resonant inverter circuit that converts an input DC voltage into a desired AC voltage and outputs the AC voltage, the method comprising:
a first determining step of determining whether a current flowing in the resonant inverter circuit is overcurrent;
a second determining step of, when overcurrent is detected at the first determining step, determining whether an elapsed time since the overcurrent was detected has reached resonance time; and
a gate-off-command generating step of, when the elapsed time has reached the resonance time at the second determining step, generating a gate-off command to turn off a switching element included in the resonant inverter circuit.

* * * * *